（12）United States Patent
Fondeur et al.

(10) Patent No.: US 9,874,698 B2
(45) Date of Patent: Jan. 23, 2018

(54) FLAT-TOP TUNABLE FILTER

(71) Applicant: Lumentum Operations LLC, Milpitas, CA (US)

(72) Inventors: Barthelemy Fondeur, San Jose, CA (US); Jinxi Shen, San Ramon, CA (US); Leonid Frenkel, Palo Alto, CA (US); Yimin Hua, Los Altos, CA (US); David R. Walker, Ottawa (CA); Yu Zhang, Kanata (CA); Vlatko Milinkovic, Ottawa (CA)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 15/152,270

(22) Filed: May 11, 2016

(65) Prior Publication Data

US 2017/0168241 A1    Jun. 15, 2017

Related U.S. Application Data

(63) Continuation of application No. 14/939,123, filed on Nov. 12, 2015, now abandoned, which is a
(Continued)

(51) Int. Cl.
*H04B 10/00* (2013.01)
*G02B 6/293* (2006.01)
(Continued)

(52) U.S. Cl.
CPC ..... *G02B 6/29353* (2013.01); *G02B 6/29355* (2013.01); *G02B 6/29395* (2013.01);
(Continued)

(58) Field of Classification Search
USPC ..................................................... 398/79–88
See application file for complete search history.

(56) References Cited

U.S. PATENT DOCUMENTS 3,875,534 A    4/1975 Haven
5,388,088 A    2/1995 Gans
(Continued)

FOREIGN PATENT DOCUMENTS

WO    WO 2007064241    6/2007

OTHER PUBLICATIONS

ITU-T G 692 "Optical Interfaces for Multichannel Systems with Optical Amplifiers", Oct. 1998, pp. 6-7, 20.

*Primary Examiner* — Agustin Bello
(74) *Attorney, Agent, or Firm* — Harrity & Harrity, LLP

(57) ABSTRACT

A tunable PLC optical filter having sequentially connected thermally tunable Mach-Zehnder (MZ) interferometers is described. The cascade of MZ interferometers, each having a free spectral ranges matching ITU frequency grid spacing, are tuned so as to have a common passband centered on the frequency of the signal being selected, while having at least one of the stopbands centered on any other ITU frequency. Any other optical channel that may be present at any other ITU frequency is suppressed as a result. Another MZ interferometer in series with the cascade of interferometers including an asymmetric or variable coupler, is tuned to have low transmission at the center frequency of the selected optical channel.

20 Claims, 14 Drawing Sheets

Related U.S. Application Data continuation of application No. 13/852,826, filed on Mar. 28, 2013, now abandoned.

(51) Int. Cl.
*H04Q 11/00* (2006.01)
*H04B 10/25* (2013.01)

(52) U.S. Cl.
CPC ..... *H04B 10/2504* (2013.01); *H04Q 11/0005* (2013.01); *H04Q 2011/0009* (2013.01); *H04Q 2011/0018* (2013.01)

(56) References Cited

U.S. PATENT DOCUMENTS

| | | | | |
|---|---|---|---|---|
| 5,572,611 | A * | 11/1996 | Jinguji | G02B 6/12007 385/17 |
| 5,596,661 | A * | 1/1997 | Henry | G02B 6/12007 385/24 |
| 6,122,084 | A | 9/2000 | Britz | |
| 6,208,780 | B1 * | 3/2001 | Li | G02F 1/225 385/15 |
| 6,285,810 | B1 * | 9/2001 | Fincato | G02F 1/3136 385/24 |
| 6,333,807 | B1 * | 12/2001 | Hatayama | G02F 1/225 359/308 |
| 6,560,381 | B2 * | 5/2003 | Hatayama | G02B 6/12007 359/337.2 |
| 6,560,681 | B1 | 5/2003 | Hatayama et al. | |
| 6,633,698 | B2 * | 10/2003 | Hatayama | G02F 1/225 385/27 |
| 6,704,487 | B2 | 3/2004 | Parhami et al. | |
| 6,724,957 | B2 * | 4/2004 | Saida | G02B 6/29355 385/27 |
| 6,731,878 | B1 | 5/2004 | Britz | |
| 6,782,158 | B2 * | 8/2004 | Zhao | G02B 6/29355 356/478 |
| 6,795,654 | B2 * | 9/2004 | Cormack | G02B 6/2935 385/24 |
| 6,941,076 | B1 | 9/2005 | Adams | |
| 6,961,492 | B2 * | 11/2005 | Doerr | G02B 6/12007 385/15 |
| 6,978,064 | B2 * | 12/2005 | Yoshida | G02B 6/12007 385/15 |
| 7,027,686 | B1 * | 4/2006 | Wang | G02B 6/2821 385/24 |
| 7,085,438 | B2 * | 8/2006 | Mizuno | G02B 6/12007 385/15 |
| 7,106,971 | B1 | 9/2006 | Davis | |
| 7,116,909 | B2 | 10/2006 | Aburakawa | |
| 7,257,327 | B2 | 8/2007 | Small | |
| 7,277,644 | B2 | 10/2007 | Johnson | |
| 7,406,261 | B2 | 7/2008 | Shattil | |
| 7,660,491 | B2 | 2/2010 | Thaniyavarn | |
| 7,756,416 | B2 | 7/2010 | Tomofuji et al. | |
| 7,778,548 | B2 | 8/2010 | Yamamoto | |
| 7,952,061 | B2 | 5/2011 | Hillis | |
| 8,098,767 | B2 | 1/2012 | Mirbagheri | |
| 8,224,139 | B2 * | 7/2012 | Little | G02B 6/12007 359/337.1 |
| 8,340,523 | B2 * | 12/2012 | Shen | G02F 1/225 398/85 |
| 8,346,088 | B2 * | 1/2013 | Sakharov | H04J 14/0201 398/79 |
| 8,666,254 | B2 | 3/2014 | Chan | |
| 8,781,331 | B2 * | 7/2014 | Sakharov | H04J 14/0208 398/79 |
| 8,824,896 | B2 | 9/2014 | Faith | |
| 9,048,950 | B2 | 6/2015 | Chen | |
| 2002/0021856 | A1 * | 2/2002 | Hatayama | G02B 6/12007 385/15 |
| 2002/0109884 | A1 | 8/2002 | Presley | |
| 2002/0109885 | A1 | 8/2002 | Aburakawa | |
| 2002/0164124 | A1 * | 11/2002 | Hatayama | G02F 1/225 385/39 |
| 2003/0035619 | A1 * | 2/2003 | Pfeiffer | G02B 6/29355 385/27 |
| 2003/0053747 | A1 * | 3/2003 | Cormack | G02B 6/2935 385/24 |
| 2003/0090765 | A1 | 5/2003 | Neff | |
| 2003/0123129 | A1 * | 7/2003 | Nakazawa | H04J 14/021 359/308 |
| 2003/0179972 | A1 * | 9/2003 | Gerlach | G02B 6/12007 385/1 |
| 2004/0042798 | A1 | 3/2004 | Kehr | |
| 2004/0239869 | A1 | 12/2004 | Cavanaugh et al. | |
| 2005/0149593 | A1 * | 7/2005 | Koster | G02B 6/12007 708/300 |
| 2006/0072866 | A1 * | 4/2006 | Mizuno | G02B 6/12007 385/1 |
| 2006/0251421 | A1 | 11/2006 | Arnon | |
| 2007/0242955 | A1 | 10/2007 | Kavehrad | |
| 2007/0253715 | A1 | 11/2007 | Small | |
| 2008/0008471 | A1 | 1/2008 | Dress | |
| 2008/0008472 | A1 | 1/2008 | Dress | |
| 2008/0037933 | A1 | 2/2008 | Furman | |
| 2008/0124076 | A1 | 5/2008 | Rudolph et al. | |
| 2008/0279558 | A1 | 11/2008 | Capron | |
| 2008/0285977 | A1 | 11/2008 | Caplan | |
| 2009/0097856 | A1 | 4/2009 | Sasai | |
| 2009/0110401 | A1 | 4/2009 | Sakharov | |
| 2009/0185811 | A1 | 7/2009 | Cho | |
| 2009/0263142 | A1 * | 10/2009 | Shen | G02F 1/225 398/158 |
| 2010/0329671 | A1 | 12/2010 | Essiambre | |
| 2011/0135308 | A1 | 6/2011 | Tarlazzi | |
| 2011/0200325 | A1 | 8/2011 | Kobyakov | |
| 2011/0286748 | A1 | 11/2011 | Davidson | |
| 2011/0286749 | A1 | 11/2011 | Schoon | |
| 2012/0008961 | A1 | 1/2012 | Chen | |
| 2013/0142517 | A1 * | 6/2013 | Sakharov | H04J 14/0201 398/85 |
| 2013/0182620 | A1 | 7/2013 | Chaffee | |
| 2013/0195464 | A1 | 8/2013 | Fath | |
| 2013/0223846 | A1 | 8/2013 | Joseph | |
| 2014/0093249 | A1 | 4/2014 | Roberts | |
| 2014/0293393 | A1 * | 10/2014 | Fondeur | G02F 1/21 359/288 |
| 2015/0349888 | A1 | 12/2015 | Chen | |
| 2016/0062208 | A1 * | 3/2016 | Fondeur | G02F 1/21 385/1 |

\* cited by examiner

FLAT-TOP TUNABLE FILTER

RELATED APPLICATIONS

This application is a continuation of U.S. application Ser. No. 14/939,123, filed Nov. 12, 2015, which is a continuation of U.S. application Ser. No. 13/852,826, filed Mar. 28, 2013, the disclosures of which are incorporated herein by reference.

TECHNICAL FIELD

The present invention relates to a tunable optical filter, and in particular to a flat-top tunable optical filter having cascaded Mach-Zehnder interferometers.

BACKGROUND OF THE INVENTION

Optical filters are often used to select at least one optical frequency band, called a passband, out of an optical frequency spectrum of an optical signal. A central frequency of the passband of a tunable optical filter is adjustable, depending upon a control parameter common to a particular filter type. For example, for a bulk optic tunable filter, the control parameter can be a filter tilt or a clocking (rotation) angle with respect to an incoming optical beam. For an optical waveguide based tunable filter such as tunable Mach-Zehnder (MZ) interferometer, the control parameter can be an electrical signal applied to a localized heater that changes the optical path length of one of its arms, which effectively tunes the MZ interferometer.

Tuning range, spectral selectivity, and a level of cross-talk suppression are very important parameters of tunable optical filters. A wide tuning range allows a wide range of optical frequencies to be accessed and selected by a tunable filter. The spectral selectivity relates to an ability of the filter to select a narrow frequency band of a broadband optical signal. Herein, the term "narrow" means small as compared to a value of the central frequency of the optical signal being filtered, for example 1% of the central frequency or less. Finally, the crosstalk suppression is an ability of the filter to suppress optical signals at any other frequency than the frequency of the signal being selected.

In an optical communications network, optical signals having a plurality of optical channels with different optical frequencies or wavelengths called optical frequency channels or wavelength channels, are transmitted from one location to another, typically through a length of optical fiber. Optical frequency channels can be combined for transmission through a single optical fiber, whereby the transmission capacity of the optical fiber increases many times. Since the optical frequency channels can be amplified simultaneously in a single optical amplifier, the transmission distances are increased, while the associated transmission costs are considerably reduced.

Tunable optical filters are used in optical communications networks for selecting one or more optical frequency channel out of a plurality of channels comprising the optical communications signal. Tunable optical filters are also used for system performance monitoring purposes, e.g. for performing a spectral measurement of the entire optical communications signal, including measuring optical noise levels between the neighboring frequency channels. The tunability of the filter allows any optical frequency component within the tuning range of the filter to be selected for subsequent detection and/or signal level measurement. Ideally, a tunable filter has excellent crosstalk suppression, since poor crosstalk suppression leads to undesired "leaking" of the optical channels being suppressed, thus impairing the signal level measurements and/or detection and decoding of the selected signal.

U.S. Pat. No. 5,596,661 entitled "Monolithic Optical Waveguide Filters based on Fourier Expansion", issued to Henry et al., and incorporated herein by reference, teaches a planar lightwave circuit (PLC) optical filter having a chain of optical couplers linked by different delays with a transfer function equal to the sum of the contribution from each optical path, with each contribution forming a term in a Fourier series whose sum forms the optical output. Detrimentally, the optical filter of Henry et al. is not tunable.

U.S. Pat. No. 6,208,780 entitled "System and Method for Optical Monitoring", issued to Li et al., and incorporated herein by reference, teaches a tunable optical filter on a PLC chip using cascaded unbalanced Mach-Zehnder (MZ) interferometers. In the tunable filter of Li et al., successive MZ stages have twice the free spectral range (FSR) as the previous MZ stages, thereby providing a narrowband optical filter having a wide tuning range. Unfortunately, the tunable optical filter requires many MZ stages, including stages that have to be repeated, to achieve a satisfactory crosstalk suppression.

U.S. Pat. No. 8,340,523 entitled "Tunable optical filter", issued to Shen et al., hereby incorporated by reference herein, teaches a tunable optical filter on a PLC chip having sequentially connected thermally tunable MZ interferometers having different FSRs. To achieve a high level of crosstalk suppression, each of the MZ interferometers is tuned so as to have one passband of each MZ interferometer centered on the central frequency of the single frequency channel being selected, and at least one of the stopbands of the MZ interferometers centered on a central frequency of each remaining optical frequency channel of the optical signal. In contrast to the tunable filter taught by Li et al., the tunable optical filter taught by Shen et al. includes MZ interferometers having FSRs that are an integral number the frequency grid. The resulting optical filter has a crosstalk that is improved by at least two orders of magnitude relative to the crosstalk performance of the filter disclosed in U.S. Pat. No. 6,208,780.

Notably, the tunable optical filter taught in U.S. Pat. No. 8,340,523 has a low insertion loss and Gaussian passband shape. In general, a flat-top passband is preferred to a Gaussian passband, since it provides a wider passband and is less likely to alter the optical signal. In order to improve the spectral shape of the passpand, Shen et al. disclose an embodiment having a interleaver stage including first and second MZ interferometers. These MZ interferometers are tuned to maximum transmission at the filter wavelength, and have a FSR that is an integral number of the frequency grid spacing. While this interleaver stage has been shown to provide a wider passband and a steeper roll-over, the bandpass is still substantially Gaussian-like in shape.

SUMMARY OF THE INVENTION

In accordance with one embodiment of the instant invention, a tunable optical filter having sequentially connected thermally tunable MZ interferometers with different FSRs includes an additional MZ stage for providing a substantially flat-top passband shape (i.e., relative to the Gaussian-like passband shape associated with U.S. Pat. No. 8,340,523). Advantageously, the MZ in this stage uses optical couplers having a coupling ratio that differs from the conventional 50%/50% ratio (e.g., used in U.S. Pat. No. 6,340,523), and thus has a substantially sinusoidal response with relatively low modulation. As a result, the total transmission of the filter, which is the sum of the Gaussian response of the cascade of MZ interferometers and the sinusoidal response of the additional MZ interferometer, will be a flat-top spectrum when the additional stage MZ is tuned to have low and/or or minimum transmission at the filter wavelength.

According to one aspect of the present invention there is provided a tunable optical filter comprising: an input port for receiving an optical signal, the optical signal including a plurality of optical frequency channels, each optical frequency channel having a central frequency substantially centered at a different frequency of predetermined frequency grid having a predetermined grid spacing; an output port for transmitting an optical frequency channel selected from the plurality of optical frequency channels; a plurality of sequentially coupled tunable Mach-Zehnder (MZ) interferometers optically disposed between the input port and the output port for isolating the selected optical frequency channel from the plurality of optical frequency channels, each tunable MZ interferometer having a plurality of equidistantly spaced conterminous frequency passbands and frequency stopbands and having a free spectral range substantially equal to an integer multiple of the predetermined grid spacing; a first MZ interferometer optically disposed between the input port and the output port, the first MZ interferometer including first and second interferometer arms optically disposed between first and second optical couplers, the first optical coupler for directing more than 75% of the light received at an input of the first MZ interferometer into the first interferometer arm, the first and second interferometer arms having different lengths, and a controller for tuning the plurality of sequentially coupled MZ interferometers to have one passband of each MZ interferometer centered on the central frequency of the selected optical frequency channel, and to have at least one of the stopbands of the MZ interferometers centered on the central frequency of each remaining optical frequency channel of the optical signal, so as to suppress each said remaining optical frequency channel of the optical signal, and for tuning the first MZ interferometer to have low transmission at the center frequency of the selected optical frequency channel.

According to another aspect of the present invention there is provided a method of filtering an optical signal comprising: passing an optical signal through a tunable optical filter, the optical signal including a plurality of optical frequency channels, each optical frequency channel having a central frequency substantially centered at a different frequency of predetermined frequency grid having a predetermined grid spacing, the tunable optical filter including: a plurality of sequentially coupled tunable Mach-Zehnder (MZ) interferometers for selecting an optical frequency channel from the plurality of optical frequency channels, each tunable MZ interferometer having a plurality of equidistantly spaced conterminous frequency passbands and frequency stopbands and having a free spectral range substantially equal to an integer multiple of the predetermined grid spacing; a first MZ interferometer optically coupled to the plurality of sequentially coupled tunable MZ interferometers, the first MZ interferometer including first and second interferometer arms optically disposed between first and second optical couplers, the first optical coupler for directing more than 75% of the light received at an input of the first MZ interferometer into the first interferometer arm, the first and second interferometer arms having different lengths; and a controller; and tuning the plurality of sequentially coupled MZ interferometers to have one passband of each MZ interferometer centered on the central frequency of the selected optical frequency channel, and to have at least one of the stopbands of the MZ interferometers centered on the central frequency of each remaining optical frequency channel of the optical signal, so as to suppress each said remaining optical frequency channel of the optical signal; and tuning the first MZ interferometer to have low transmission at the center frequency of the selected optical frequency channel.

BRIEF DESCRIPTION OF THE DRAWINGS

The invention will be described in greater detail with reference to the accompanying drawings, in which.

It will be noted that throughout the appended drawings, like features are identified by like reference numerals.

DETAILED DESCRIPTION OF PREFERRED EMBODIMENTS

Figure 1:
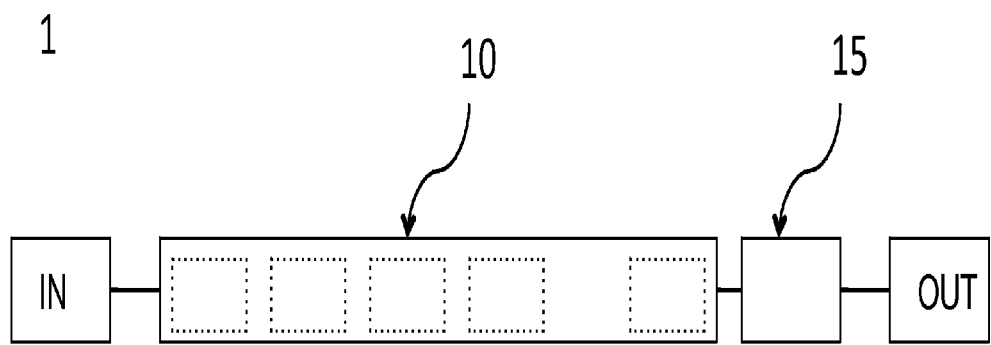
FIG. 1 is a schematic diagram of a tunable flat-top optical filter in accordance with one embodiment of the instant invention.

FIG. 1 is a schematic diagram of a flat-top optical filter according to one embodiment of the instant invention. The flat-top filter 1 includes a cascade of Mach-Zehnder (MZ) interferometers 10 connected in series with another MZ interferometer 15. Each MZ interferometer in the cascade of MZ interferometers 10 is commonly referred to as a stage, a MZ stage, and/or a filter stage.

Figure 2:
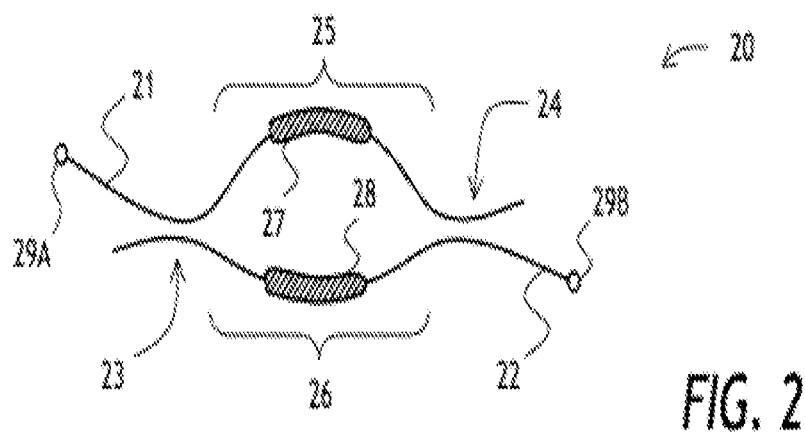
FIG. 2 is an optical diagram of an unbalanced Mach-Zehnder (MZ) interferometer having symmetric couplers.

Referring to FIG. 2, an optical diagram of a MZ interferometer 20, which represents any one of the MZ interferometers in the cascade of MZ interferometers 10, is shown. The MZ interferometer 20 has two waveguides 21 and 22 brought into close proximity to each other at 50%, or 3-dB, evanescent coupler regions 23 and 24, thereby forming two arms 25 and 26. The arms 25 and 26 have a localized heater 27 and 28, respectively, for heating the arms 25 and 26, thereby tuning the MZ interferometer 20 by changing relative optical length of these arms. In general, the tuning range of the heaters will be at least one wavelength, or $2\pi$ in optical phase units. The MZ interferometer 20 is an unbalanced MZ interferometer, meaning that the optical lengths of the arms 25 and 26 differ from each other by more than a few microns, e.g. more than 10 microns. Ports 29A and 29B at the ends of the waveguides 21 and 22 are used as input and output ports of the MZ interferometer 20, respectively. Alternatively, the opposite ends of corresponding waveguides 21 and 22 are used as input or output ports. Notably, since the directional couplers 23, 24 are symmetric couplers (i.e., provide a 50%/50% coupling ratio), maximum modulation spectrum for the bar state is provided (e.g., at the output port 29B).

Figure 3:
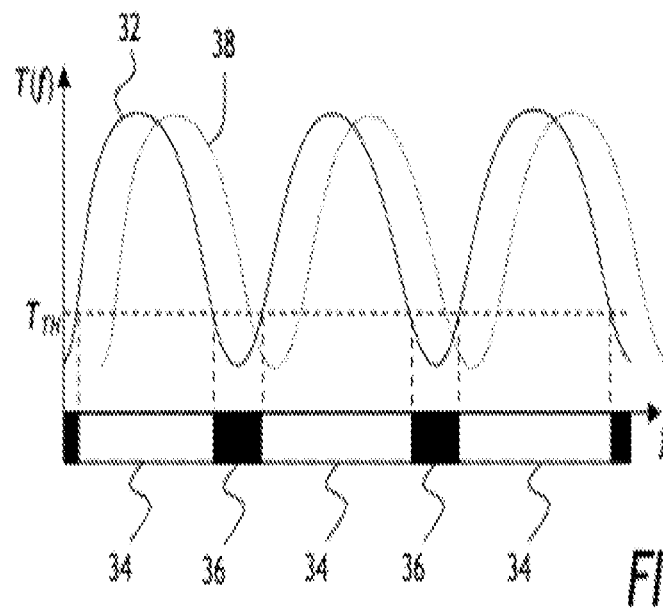
FIG. 3 is a transmission spectrum of the unbalanced MZ interferometer of FIG. 2.

Turning to FIG. 3, a typical transmission spectrum of the MZ interferometer 20 between the ports 29A and 29B thereof is shown. Solid line 32 denotes the transmission function T (f), wherein f is optical frequency. The MZ interferometer 20 has a plurality of equidistantly spaced conterminous frequency passbands 34 and frequency stopbands 36, wherein in any frequency passband 34, the transmission T is equal to or higher than a threshold value of transmission $T_{TH}$, and in any frequency stopband 36, the transmission T is lower than the threshold value $T_{TH}$. As the local heaters 27 and 28 are activated, the relative temperature of the arms 25 and 26 changes, which shifts its transmission function T(f) as is shown by a dotted line 38. Shifts in both directions are possible by properly adjusting the relative temperature of the local heaters 27 and 28. The spacing in optical frequency or wavelength between two successive optical intensity maxima is referred to as the free spectral range (FSR).

In general, the cascade of MZ interferometers 10 will include a plurality of MZ interferometers having different FSRs. When the FSR of each of the MZ interferometers 10 is selected in dependence upon the frequency grid spacing of the optical signal to be filtered (e.g., the International Telecommunications Union (ITU) frequency grid), the cascade of MZ interferometers 10 can function as a filter. For example, the cascade of MZ interferometers 10 functions as a filter when the MZ interferometers are tuned so as to have a common passband centered on the frequency of the signal being selected, and at least one of the stopbands centered on any other ITU frequency. As a result, any other optical channel that is present at any other ITU frequency is suppressed.

Figure 4A:
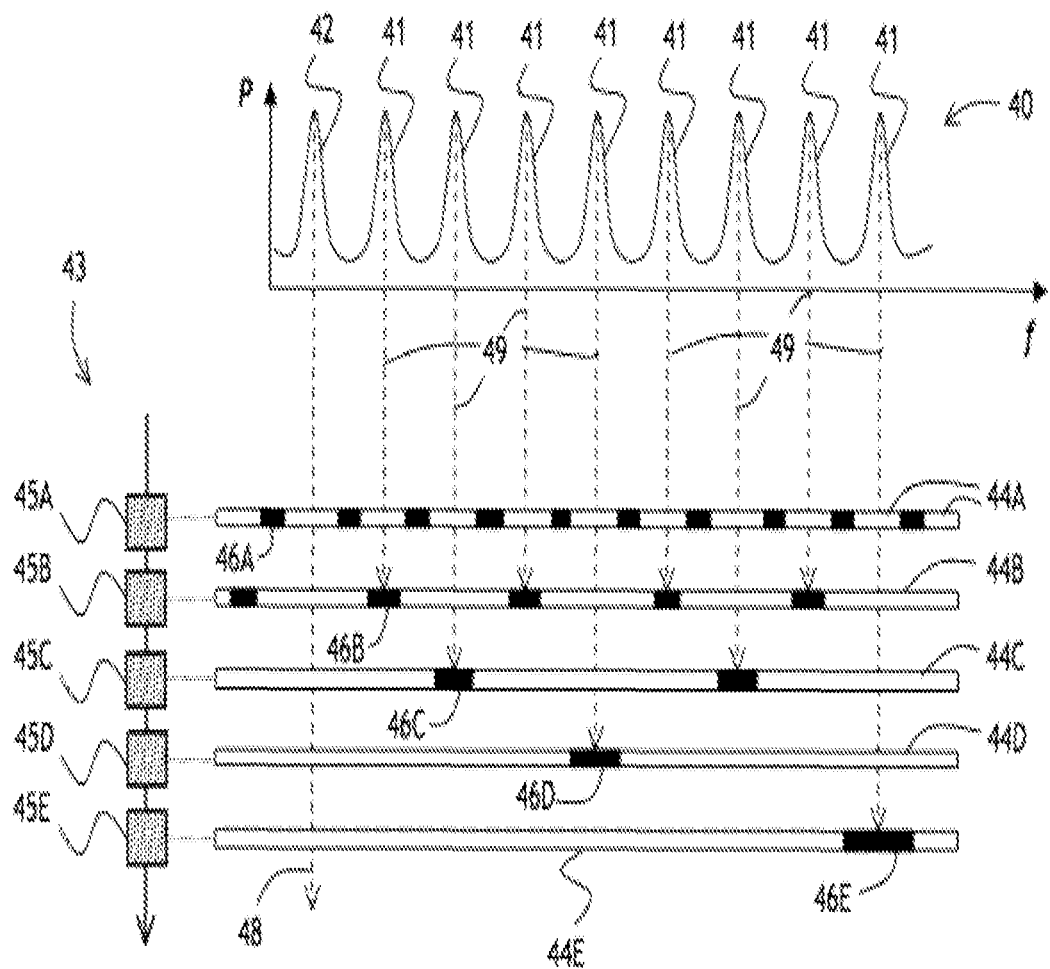
FIGS. 4A and 4B are diagrams illustrating the principle of cross-talk suppression using a cascade of unbalanced MZ interferometers.

For example, referring to FIG. 4A, the spectral shape of a typical optical signal 40 in an optical communications network is shown. The optical signal 40 includes equidistantly spaced optical frequency channels 41 to be suppressed, and an optical frequency channel 42 to be selected. The optical signal is input into the input port of the cascade of MZ interferometers 10, which for exemplary purposes is illustrated as a plurality of MZ interferometers 43, including sequentially coupled tunable MZ interferometers 45A to 45E. Each MZ interferometer 45A to 45E has a plurality of equidistantly spaced conterminous frequency passbands 44A to 44E and frequency stopbands 46A to 46E, corresponding to the passbands 34 and stopbands 36 of FIG. 3. To achieve a high level of crosstalk suppression, the MZ interferometers 45A to 45E are tuned so as to have one passband 44A to 44E of each MZ interferometer 45A to 45E centered on the central frequency of the single frequency channel 42 being selected, while having at least one of the stopbands 46A to 46E of the MZ interferometers 45A to 45E centered on a central frequency of each remaining optical frequency channel 41 of the optical signal, so as to suppress each said remaining optical frequency channel 41 as shown with dashed arrows 49, while selecting the optical frequency channel 42 as shown with a dashed arrow 48. Accordingly, the plurality of MZ interferometers 43 functions as an optical filter.

As discussed above, the optical frequency channels 41 and 42 are centered at on a frequency grid (e.g. a 100 GHz ITU frequency grid or a 50 GHz ITU frequency grid). Notably, the phrase "centered on a frequency grid" refers to being substantially centered in that the channels may deviate somewhat from the exact grid frequencies, according to typical tolerances of corresponding transmitters, as is appreciated by those skilled in the art. The optical filter 43, tuned as shown in FIG. 4A, can be used for selecting the optical frequency channel 42 for adding or dropping at a network node, or it can be used simply to measure optical power of the channel 42.

Figure 4B:
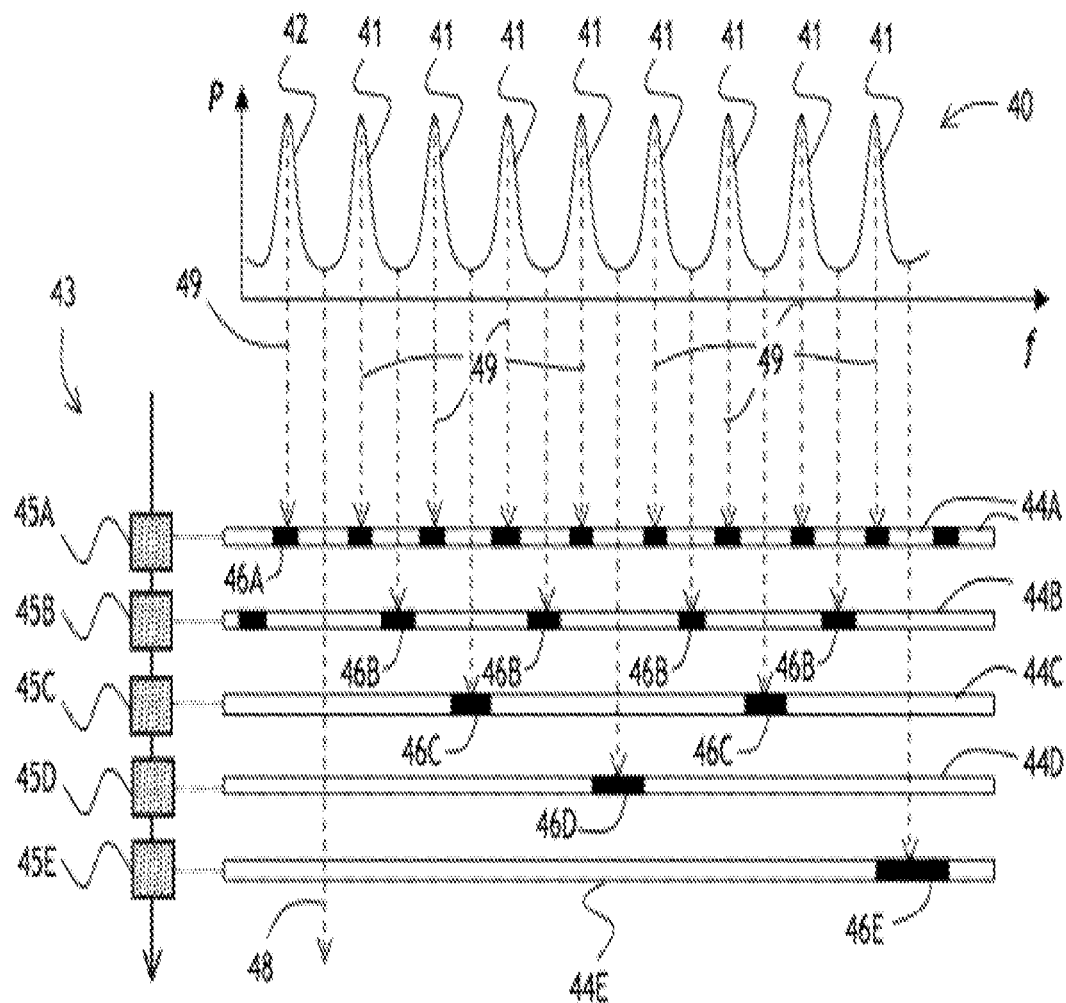

Turning now to FIG. 4B, a diagram illustrating the operation of the optical filter 43 for measuring optical signal-to-noise ratio (SNR) of the single optical frequency channel 42 of the plurality of the optical frequency channels 41 of the optical signal 40 is illustrated. At a first step, the optical filter 43 is tuned as shown in FIG. 4A, and the optical power of the channel 42 is measured. Then, the optical filter 43 is tuned so as to center one passband 44A to 44E of each tunable MZ interferometer 45A to 45E on a frequency disposed substantially in the middle between the central frequency of the optical frequency channel 42 and the central frequency of one of the neighboring optical frequency channels 41. The optical filter 43 is tuned so as to have at least one of the stopbands 46A to 46E of the MZ interferometers 45A to 45E centered on a central frequency of each remaining optical channel 41, to suppress each said remaining optical frequency channel of the optical signal 40. Then, the optical power of a noise signal at an output end of the filter 43 is measured, and a ratio is taken of the measured value of the optical power of the single optical frequency channel 42 to the measured value of the optical power of the noise signal. This ratio is the SNR of the optical frequency channel 42.

To achieve the functionality described in FIGS. 4A and 4B, the tunable MZ interferometers 45A to 45E have their respective free spectral ranges satisfying the following condition:

$$FSR_m = (2^{m-1}) * \Delta f_{ITU}, \quad (1)$$

wherein m=1 . . . 5 for the interferometers 45A to 45E, and $\Delta f_{ITU}$ is an ITU grid spacing, for example, a 50 GHz or a 100 GHz grid spacing. In other words, each MZ has an FSR that is an integer multiple of the ITU grid spacing.

In addition to designing the FSR of each MZ interferometer in the cascade of MZ interferometers 10 to be an integer multiple of the grid spacing, the FSRs will typically increase or decrease along the chain. For example, in one embodiment, the cascade of MZ interferometers 10 is a nine stage filter for an optical signal on the 50 GHz ITU grid, wherein the FSR of the MZ interferometers in the first and second stages is 50 GHz, in the third and fourth stages is 100 GHz, in the fifth and sixth stages is 200 GHz, in the seventh stage is 400 Hz, in the eighth stage is 800 GHz, and in the ninth stage is 1600 GHz. In another embodiment, the cascade of MZ interferometers 10 is an eight stage filter for an optical signal on the 100 GHz ITU grid, wherein the FSR of the MZ interferometers in the first stage is 6400 GHz, in the second stage is 3200 GHz, in the third stage is 1600 GHz, in the fourth stage is 800 GHz, in the fifth and sixth stages is 400 GHz, and in the seventh and eighth stages is 200 Hz. In general, the number of stages in the cascade of MZ interferometers 10 will vary between 1 and 20, and more typically between 3 and 18 depending of the filter requirements. In general, each MZ interferometer in the cascade of MZs interferometers 10 will be tuned to high transmission at the filter wavelength.

Figure 5:
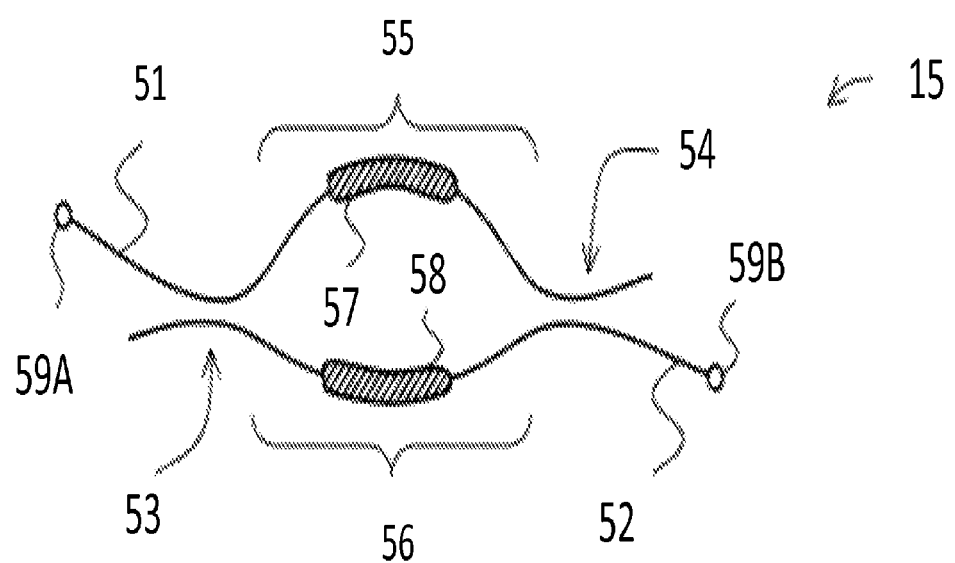
FIG. 5 is an optical diagram of an unbalanced MZ interferometer having asymmetric couplers.

Referring to FIG. 5, an optical diagram of the MZ interferometer 15 is shown. The MZ interferometer 15 has two waveguides 51 and 52 brought into close to each other to form evanescent coupler regions 53 and 54, thereby forming two interferometer arms 55 and 56. However, rather than the 50%/50% coupling ratio provided by couplers 23, 24, these coupling regions are designed to form asymmetric directional couplers 53 and 54. The interferometer arms 55 and 56 have a localized heater 57 and 58, respectively, for heating the arms 55 and 56 thereby tuning the MZ interferometer 15 by changing relative optical length of these arms. The MZ interferometer 15 is an unbalanced MZ interferometer, meaning that the optical lengths of the arms 55 and 56 differ from each other by more than a few microns, e.g. more than 10 microns. Ports 59A and 59B at the ends of the waveguides 51 and 52 are used as input and output ports of the MZ interferometer 15. In another embodiment, opposite ends of corresponding waveguides 51 and 52 are used as input or output ports.

In contrast to the MZ interferometers in the cascade 10, which are tuned to maximum transmission at the filter wavelength, the MZ interferometer 15 typically is tuned to low transmission at the filter wavelength, and more commonly is tuned to minimum transmission at the filter wavelength. In addition, in contrast to the FSR of the MZ interferometers in the cascade 10, which are typically an integer multiple of the grid spacing, the FSR of the MZ interferometer 15 does not have to be matched to the grid spacing (e.g., the ITU frequency grid). For example, in some embodiments, the FSR will be smaller or greater than the grid spacing. In general, the FSR of the MZ interferometer will vary typically between about 50% and 150% of the grid spacing, and more typically will be between 75% and 125% of the grid spacing. Notably, exceptional results have been calculated when the FSR of the interferometer 15 is about equal to the grid spacing.

As discussed above, the MZ interferometer 15 includes asymmetric directional couplers 53 and 54. In general, the coupling ratio of the asymmetric couplers 53, 54 will be between 75%/25% and 100%/0%. For example, in one embodiment, the coupling ratio of each of the couplers 53, 54 is 85%/15% so that 85% of the signal goes into the upper arm 55, while 15% goes into the lower arm 56 of the interferometer. Notably, exceptional results have been calculated for coupling ratios close to 80%/20%. Since the directional couplers 53, 54 are asymmetric couplers (i.e., with coupling ratios other than the conventional 50%/50%), low modulation spectrum in the bar state is provided. More specifically, the transmission spectrum of the optical signal exiting the MZ interferometer will not correspond to the cosine curve provided by a 50%/50% directional coupler, but rather will correspond to a slightly modified sine curve with a relatively low dynamic range.

The total transmission of the optical filter 1 will be the sum of the Gaussian-like response of the cascade of MZ interferometers 10 and the sinusoidal response of the MZ interferometer 15. The response of the cascade of MZ interferometers 10 and MZ interferometer 15 has been modeled, wherein the cascade of interferometers 10 includes fifteen stages (i.e., wherein the FSR in the first and second stages is 6400 GHz, in the third and fourth stages is 3200 GHz, in the fifth and sixth stages is 1600 GHz, in the seventh and eight stages is 800 GHz, in the ninth and ten stages is 400 GHz, in the eleventh and twelfth stages is 200 GHz, in the thirteenth and fourteenth stages is 100 GHz, and in the fifteenth stage is 150 GHz), and wherein the MZ interferometer 15 has a coupling ratio of 80%/20% and a FSR of 50 GHz. The optical signal to be filtered is on the 50 GHz ITU grid.

Figure 6:
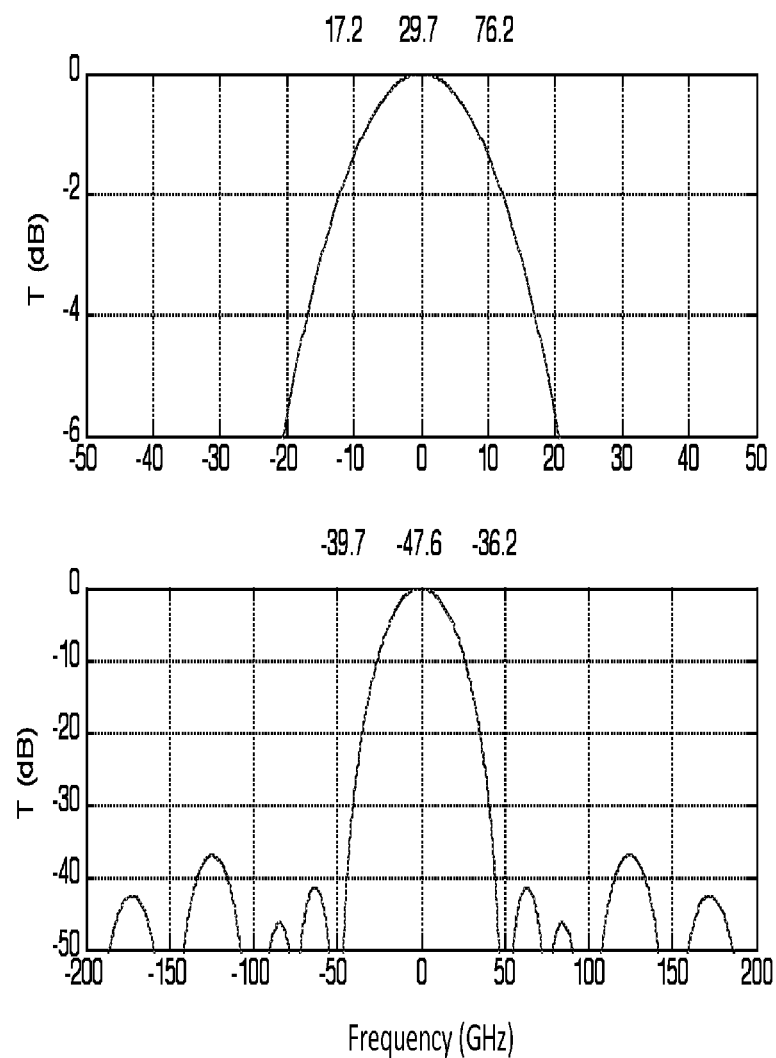
FIG. 6 shows transmission spectra simulated for a cascade of fifteen unbalanced MZ interferometers having symmetric couplers.

Referring to FIG. 6 there is shown the simulated transmission spectrum of the cascade of interferometers 10, wherein the top half of the figure corresponds to a zoomed-in view of the bottom half of the figure. The resulting Gaussian-shaped spectrum has a 1 dB passband bandwidth of 17 GHz, a 3 dB passband bandwidth of 29.7 GHz, and a 20 dB passband bandwidth of 76.2 GHz.

Figure 7:
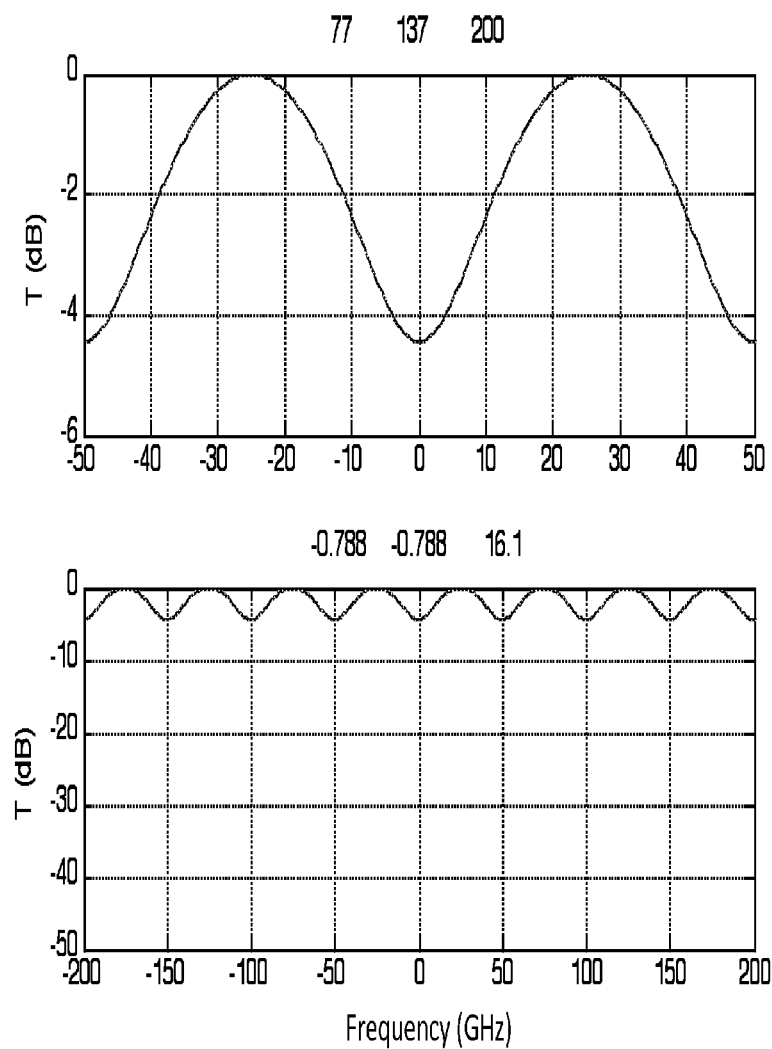
FIG. 7 shows transmission spectra simulated for a single unbalanced MZ interferometers having asymmetric couplers.

Referring to FIG. 7 there is shown the simulated transmission spectrum of the MZ interferometer 15, wherein the top half of the figure corresponds to a zoomed-in view of the bottom half of the figure. The resulting spectrum has a substantially sinusoidal shape, including a plurality of equidistantly spaced optical intensity maxima and minima. As discussed above, MZ interferometer is tuned to minimum transmission at the filter wavelength (i.e., there is an optical intensity minimum centered at the filter wavelength). Notably, the spectrum has a low dynamic range (e.g., about 5 dB) and does not extend to close to zero transmission.

Figure 8:
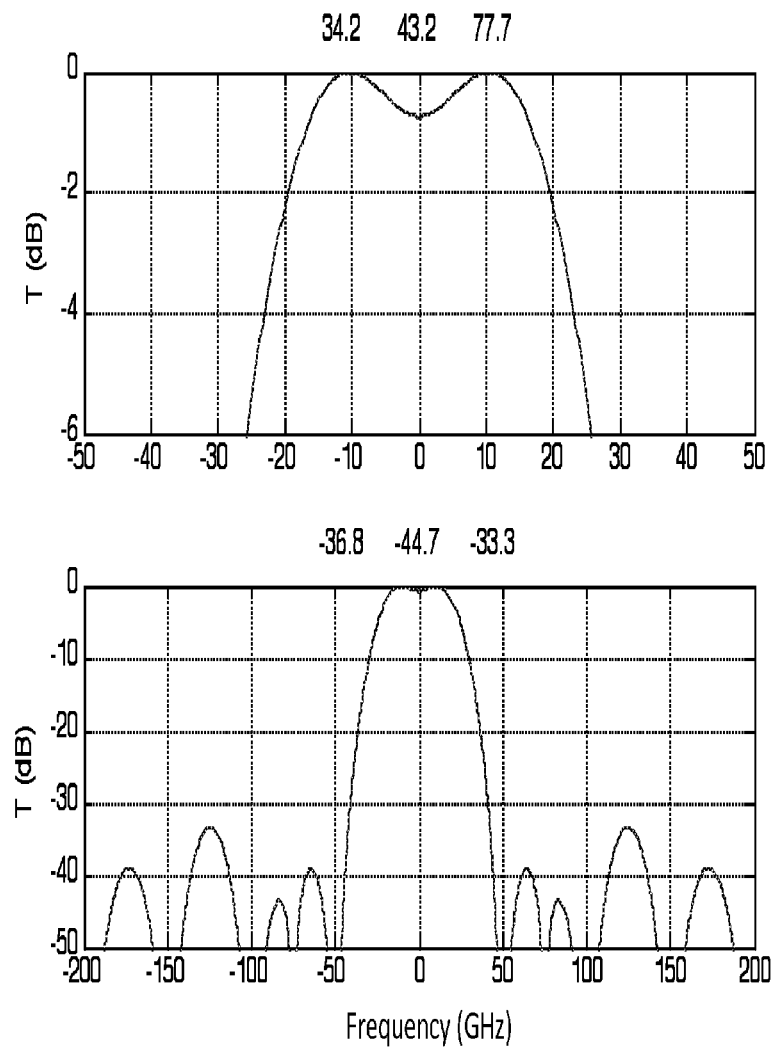
FIG. 8 shows transmission spectra simulated for a tunable optical filter including a cascade of fifteen unbalanced MZ interferometers having symmetric couplers in optical series with a single unbalanced MZ interferometer having asymmetric couplers.

As discussed above, the total transmission of the optical filter 1 will be the sum of the Gaussian-like response of the cascade of MZ interferometers 10 and the sinusoidal response of the MZ interferometer 15. Referring to FIG. 8, there is shown the simulated transmission spectrum of the cascade of interferometers 10 in series with the MZ interferometer 15, wherein the top half of the figure corresponds to a zoomed-in view of the bottom half of the figure. The resulting spectrum has a substantially flat-top shape, and has a 1 dB passband bandwidth of 34.2 GHz, a 3 dB passband bandwidth of 43.2 GHz, and a 20 dB passband bandwidth of 77.7 GHz. Accordingly, the 1 dB passband bandwidth has increased from 17 GHz to 34.2 GHz, while the 3 dB passband bandwidth has increased from 29.7 GHz to 43.2 GHz, thus illustrating that the instant configuration provides a wider passband with a steeper roll over, thereby further improving isolation between adjacent optical frequency channels.

In general, in order to improve the spectral bandshape of a filter it is desirable to minimize the ratio of the 20 dB bandpass bandwidth to the 1 dB bandpass bandwidth. In the above described simulation, using the MZ interferometer 15 changes this ratio from 4.5 (i.e., 76.2 GHz/17 GHz) to 2.3 (i.e., 77.7 GHz/34.3 GHz). Accordingly, it is clear that this configuration provides a substantially flat-top transmission spectrum.

Figure 9:
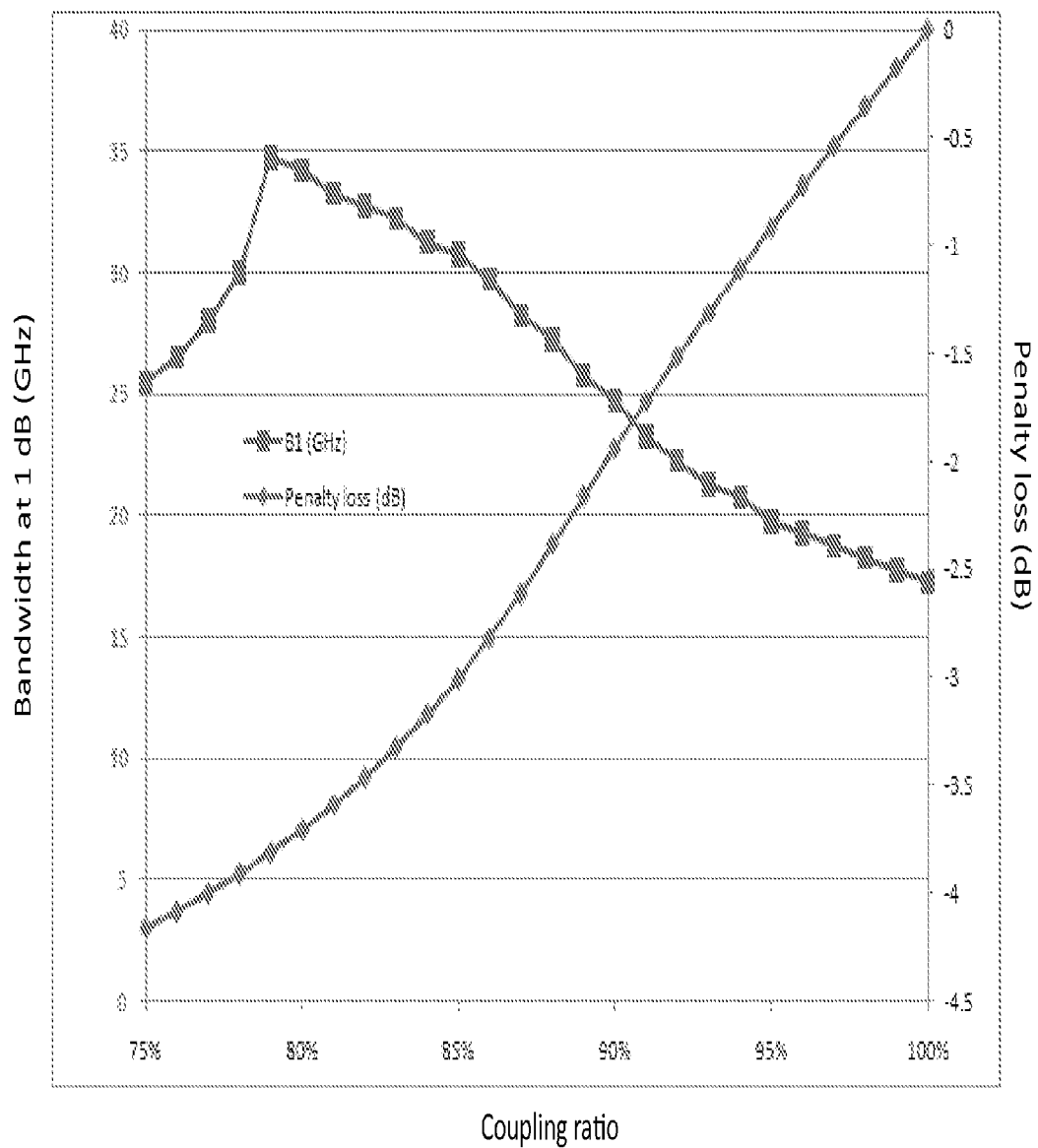
FIG. 9 shows a plot of the 1 dB passband bandwidth and the penalty loss for the tunable optical filter discussed with reference to FIG. 8, as a function of coupling ratio of the single unbalanced MZ interferometers having asymmetric couplers.

Referring again to FIG. 8, there is an approximately 4 dB penalty loss calculated for the center wavelength. In general, the penalty loss will be dependent, at least in part, on the coupling ratio of the asymmetric direction couplers. For example, referring to FIG. 9, simulations indicate that the penalty loss will decrease from about 3 dB at a coupling ratio of 75%/25%, to zero at coupling ratio of 100%/0%. In contrast, simulations also show that the passband bandwidth increases with decreasing coupling ratio (e.g., the bandwidth increases from about 17 GHz at a coupling ratio of 100%/0% to about 26 GHz at a coupling ratio of 75%/25%, peaking at almost 35 GHz near a coupling ratio of 80%/20%). Accordingly, the choice of coupling ratio of the asymmetric couplers in the MZ interferometer 15 will typically involve a compromise between low penalty loss and larger bandwidth. Notably, a coupling ratio of 100%/0% corresponds to the special case wherein all of the light travels to the upper arm of the interferometer producing substantially zero modulation, and thus a Gaussian output from the filter. In general, the coupling ratio of the asymmetric couplers will be selected such that the percent of light going into the upper arm will vary between 75% and 100%, and more typically will be between 75% and 90%. As discussed above, exceptional bandwidth has been predicted when the percentage of light going into the upper arm of the directional couplers is about 80%.

In the above described embodiment, the optical filter 1 is depicted as including a cascade of MZ interferometers 10 followed by a MZ interferometer 15. In other embodiments, additional components are provided and/or the relative position of the cascade of MZ interferometers 10 and the MZ interferometer 15 is interchanged.

Figure 10:
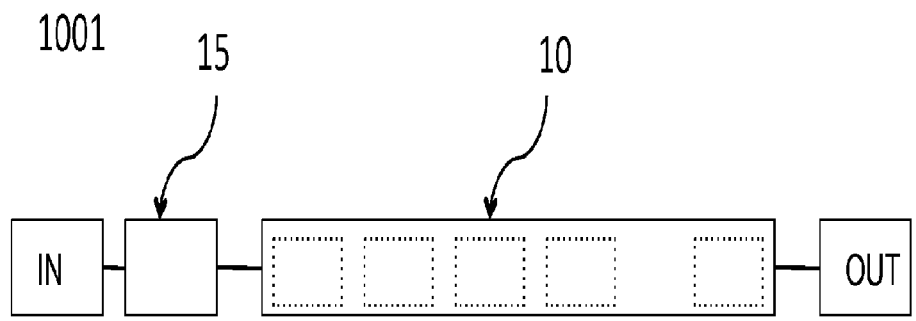
FIG. 10 is a schematic diagram of a tunable flat-top optical filter in accordance with another embodiment of the instant invention, wherein the cascade of unbalanced MZ interferometers having symmetric couplers is disposed after the single unbalanced MZ interferometer having asymmetric couplers.

Referring to FIG. 10, there is shown an embodiment of a flat-top tunable optical filter 1001 in accordance with one embodiment of the instant invention, wherein the cascade of MZ interferometers 10 follows the MZ interferometer 15.

Figure 11:
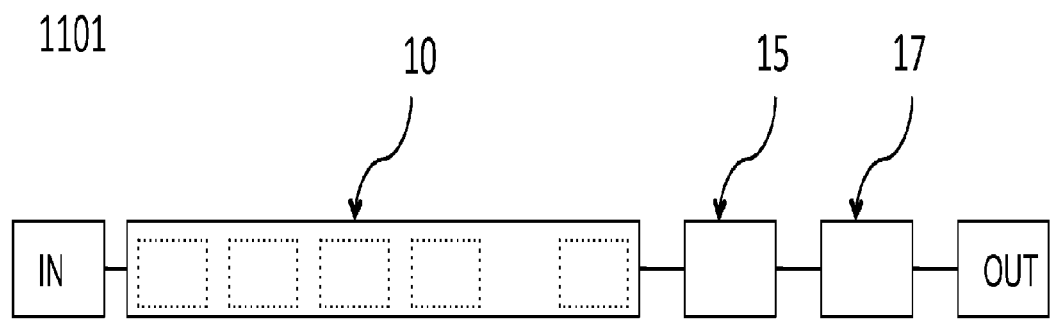
FIG. 11 is a schematic diagram of a tunable flat-top optical filter in accordance with another embodiment of the instant invention, including a shutter for hitless operation.

Referring to FIG. 11, there is shown an embodiment of a flat-top tunable optical filter 1101 in accordance with one embodiment of the instant invention, including an optical shutter or variable optical attenuator (VOA) 17. In this embodiment, the optical shutter and/or VOA is provided at the output end of the optical filter 1101 for diverting all or a portion of the output signal away from the output port, and includes a balanced MZ stage having two output ports. The difference in arm length between the arms of the balanced MZ stage is adjusted with one or more heaters, to various positions between 0° and 180° out of phase so as to provide variable attenuation and/or blocking function. Of course, alternative shutter and/or VOA arrangements are possible, as is well known in the art. For example, in another embodiment, the optical shutter and/or VOA 17 is provided closer to the input port of the filter 1001. Advantageously, the VOA and/or optical shutter 17 can be used for suppressing the optical signal carrying all optical frequency channels by diverting all or a portion of the output signal away from the output port, for example during tuning of the tunable filter, and thus provides a hitless tunable filter.

In the above described embodiments of the instant invention, a single MZ interferometer 15 is used to provide the substantially flat-top spectral response. However, in other embodiments one more additional MZ interferometers having asymmetric couplers are used to further adjust the spectral bandshape and/or improve flatness.

Figure 12:
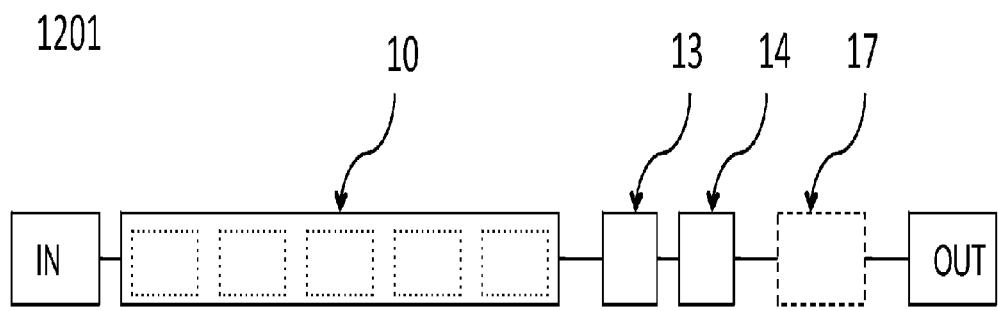
FIG. 12 is a schematic diagram of a tunable flat-top optical filter in accordance with another embodiment of the instant invention, including two unbalanced MZ interferometers having asymmetric couplers.

Referring to FIG. 12, there is shown an embodiment of a flat-top tunable optical filter 1201 in accordance with one embodiment of the instant invention, including the cascade of MZ interferometers 10, a first MZ interferometer 13, and a second MZ interferometer 14. Optionally, the optical shutter or variable optical attenuator (VOA) 17 is provided.

Figure 13:
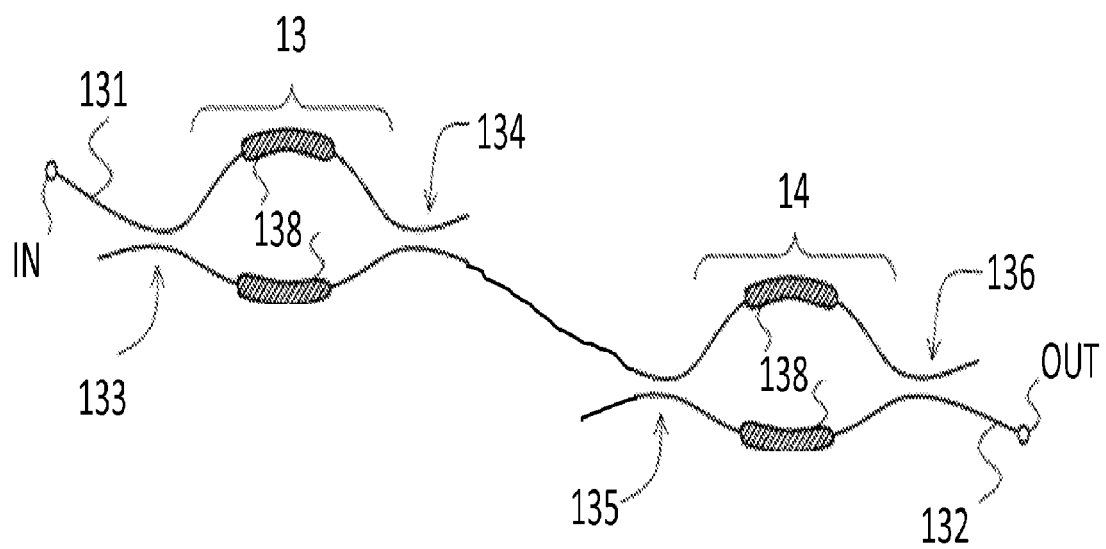
FIG. 13 is an optical diagram of the two unbalanced MZ interferometers having asymmetric couplers.

Referring to FIG. 13, an optical diagram illustrating the first 13 and second 14 MZ interferometers is shown. The MZ interferometers 13, 14 have waveguides 131 and 132 brought close to each other to form evanescent coupler regions 133, 134, 135, and 136. Each directional coupler 133, 134, 135, and 136 is an asymmetric directional coupler having a coupling ratio between 75%/25% and 100%/0%. Each interferometer 13, 14 has localized heaters 138 for heating the interferometer arms, thereby tuning the MZ interferometers 13, 14 by changing relative optical length of the interferometer arms. In general, each of the MZ interferometers 13, 14 will be tuned to low transmission at the filter wavelength. The MZ interferometers 13, 14 are unbalanced MZ interferometers, and will typically have a FSR that varies between about 50% and 150% of the grid spacing, and more typically will be between 75% and 125% of the grid spacing. For example, in one embodiment each MZ stage 13, 14 has an FSR that is about equal to the grid spacing.

Since each MZ stage 13, 14 includes asymmetric directional couplers, the output transmission spectrum of each stage will correspond to substantially sinusoidal curve. The total transmission of the optical filter 1201 will be the sum of the Gaussian-like response of the cascade of MZ interferometers 10 and the sinusoidal responses of the MZ interferometer 13, 14. However, unlike the single MZ interferometer 15, which is typically tuned to tuned to minimum transmission at the filter wavelength, the filter 1201 is tuned such that each MZ interferometer 13, 14 has low transmission at the filter wavelength, and such that an optical intensity minimum of each MZ is symmetrically offset from the filter wavelength. For example, in one embodiment the first MZ interferometer 13 is tuned to have a minimum transmission at −10 GHz relative to the filter frequency, while the second MZ interferometer 14 is tuned to have minimum transmission at +10 GHz relative to the filter frequency. Advantageously, this configuration further improves the flatness of the transmission spectrum and reduces the penalty loss at the filter wavelength.

In the above described embodiments of the instant invention, the MZ interferometers 15, 13, and 14 have fixed coupling ratios. In other embodiments, the MZ interferometers 13, 14, 15 are replaced with MZ interferometers having a tunable coupling ratio.

Figure 14:
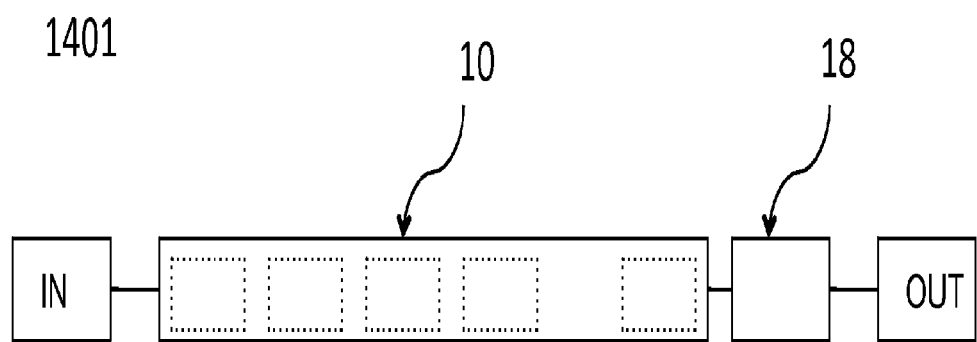
FIG. 14 is a schematic diagram of a tunable flat-top optical filter in accordance with another embodiment of the instant invention, including a single unbalanced MZ interferometer, wherein the couplers are MZ variable couplers (VC)

Referring to FIG. 14, there is shown an embodiment of a flat-top tunable optical filter 1401 in accordance with one embodiment of the instant invention, including the cascade of MZ interferometers 10 and a MZ interferometer 18 using Mach-Zehnder variable couplers (VC).

Figure 15:
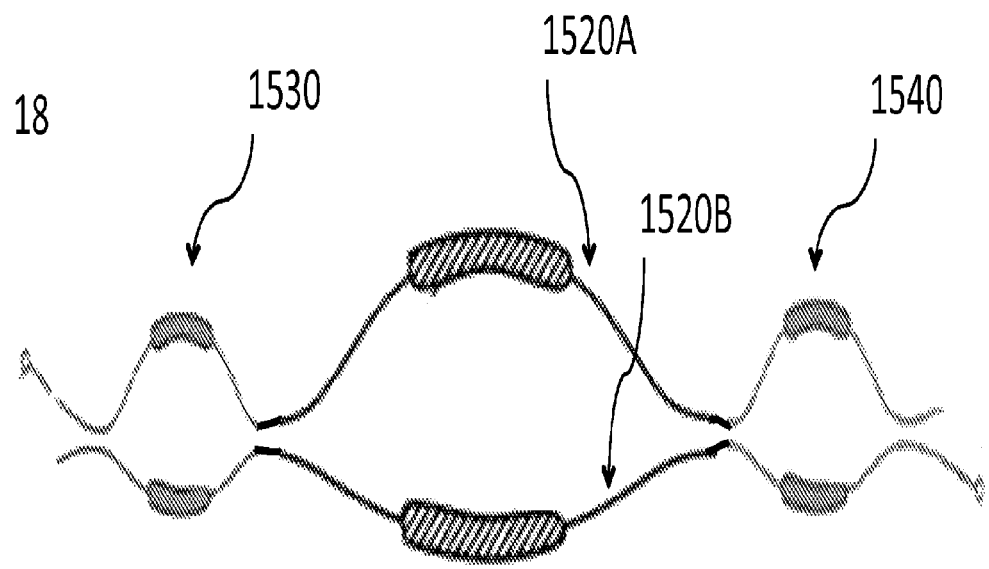
FIG. 15 is an optical diagram of the single unbalanced MZ interferometer, wherein the couplers are MZ VC.

Referring to FIG. 15, an optical diagram illustrating the MZ interferometer 18 is shown. The MZ interferometer 18 is an unbalanced MZ interferometer, meaning that the optical lengths of the interferometer arms 1520A, 1520B differ from each other by more than a few microns, e.g. more than 10 microns. Light is directed into the interferometer arms 1520 A,B via a first MZ VC 1530, and transmitted to the output port via a second MZ VC 1540. Each MZ VC 1530, 1540 is a balanced MZ interferometer having two input/output ports. The FSR of each MZ VC 1530, 1540 will typically be much larger than the overall span of the WDM spectrum. In general, the FSR of the MZ interferometer 18 will vary between about 50% and 150% of the grid spacing, and more typically will be between 75% and 125% of the grid spacing. For example, in one embodiment, the FSR of the interferometer 18 is about equal to the grid spacing.

In operation, localized heaters coupled to each of the MZ VC 1530, 1540 adjust the relative optical length of the VC interferometer arms to produce varying degrees of interference, and thus a varying amount of light into the MZ interferometer arms 1520A, 1520B. In general, the first MZ VC 1530 will be adjusted such that the amount of light transmitted to the upper arm 1520A varies from 75% up to and including 100% of the input light. When 100% of the light is transmitted into the upper arm 1520A, the transmission spectrum of the filter 1401 will have a substantially Gaussian shape. In contrast, when 75% to 90% of the light is transmitted into the upper arm 1520A, the transmission spectrum of the interferometer 18 will correspond to a modified sine curve with a relatively low dynamic range. As a result, when the localized heaters coupled to the MZ interferometer arms 1520A, 1520B are used to tune the MZ interferometer 18 to minimum transmission at the filter wavelength, the transmission spectrum of the filter 1401 will have substantially flat-top shape.

Advantageously, this configuration provides a MZ interferometer 18, wherein the coupling ratio of the couplers is variable. Accordingly, the local heaters coupled to the MZ VC 1530, 1540 are adjusted to provide a coupling ratio within the predetermined range, while the local heaters coupled to interferometer arms 1520A, 1520B are adjusted to tune the interferometer, thus providing exceptional flexibility in adjusting and/or optimizing the passband shape. For example, as discussed above, adjusting the local heaters coupled to the MZ VCs 1530, 1540 to provide a coupling ratio of 100%/0% provides a Gaussian passband, whereas adjusting the local heaters coupled to the MZ VCs 1530, 1540 to provide a coupling ratio of 80%/20% provides a flat-top passband.

Advantageously, the tunable optical filter 1401 has high potential for applications, such as colorless flex-grid applications, wherein it is desirable to select the passband shape in dependence on the channel signal modulation and/or other parameters. In addition, since the MZ variable couplers can provide a coupling ratio of 100%/0%, the need for extra components to provide an optical signal bypass is obviated.

Further advantageously, the tunable optical filter 1401 has no moving parts and is small enough to be placed within a single standard hot-pluggable XFP package. In fact, in each of the above described embodiments, the tunable optical filters are readily fabricated on a single planar light waveguide circuit (PLC) chip using methods well known in the art. For example, in one embodiment the cascade of interferometers 10 and the bandpass flattening MZ interferometers (i.e., 13, 14, 15, and/or 18) are arranged in different sections on a PLC that are coupled to each other via loop-back sections, sections of optical fibers, and/or mirrors, as for example discussed in U.S. Pat. No. 8,340,523. In each case, the plurality of sequentially connected thermally tunable MZ interferometers are connected in series such that the output port of one stage corresponds to the input port of a subsequent stage. In one embodiment, the tunable optical filters utilizing PLC technology will include PLC waveguides formed using an accepted technique, such as titanium diffusion or proton exchange, in a silicon, polymer, or semiconductor layer deposited on a substrate. For example in one embodiment, the PLC waveguides are formed using a photolithography process, wherein a positive or negative photoresist and/or photomask is used to provide the MZ interferometer patterns. Photolithography processes used to fabricate MZ interferometers are well known in the art and are not described further herein.

Figure 16:
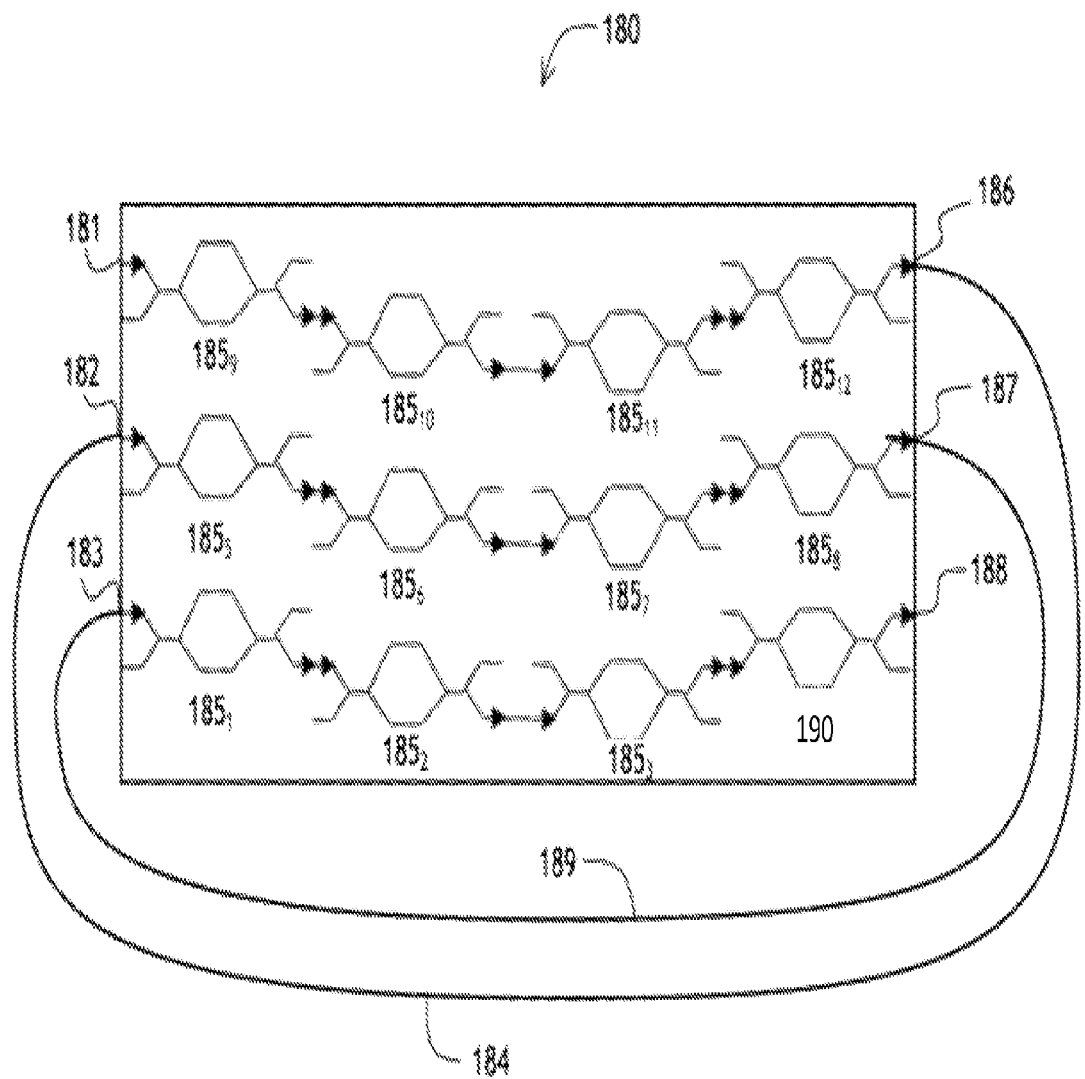
FIG. 16 is a top view of a flat-top tunable optical filter in accordance with one embodiment of the instant invention, wherein the filter is integrated on a single PLC chip in a plurality of parallel rows with optical fibers optically coupling the different rows.

Referring to FIG. 16, there is shown a flat-top tunable optical filter according to one embodiment of the instant invention, integrated on a single PLC chip 180. The filter includes a plurality of sequentially coupled tunable MZ interferometers including a cascade of MZ interferometers $185_{1-3, \, 5-12}$, as described with reference to FIG. 2, and another MZ interferometer 190, as described with reference to FIG. 5. The plurality of sequentially coupled tunable MZ interferometers are arranged in three sections. Each section on the chip 180 has an input port 181, 182, or 183, and an output port 186, 187, and 188. Accordingly, after passing through the first plurality of interferometers, e.g. the interferometers $185_9$ to $185_{12}$, an optical signal injected into the input port 181 is routed out of the chip 160 at the output port 186 via an optical fiber 184 to the second input port 182. The second input port 182 enables the remaining optical signal to pass through the next plurality of stages, e.g. the stages $185_5$ to $185_8$, after which the optical signal is again routed out of the chip 180 at the output port 187 via an optical fiber 189 to a third input port 183. The third input port 183 enables the remaining optical signal to pass through the next plurality of stages, e.g. the stages $185_1$ to $185_3$ and 190, after which the optical signal is routed to the output port 188. Advantageously, using the loopback fibers 184 and 189 allows for a considerable reduction of size of the PLC chip 180.

Figure 17:
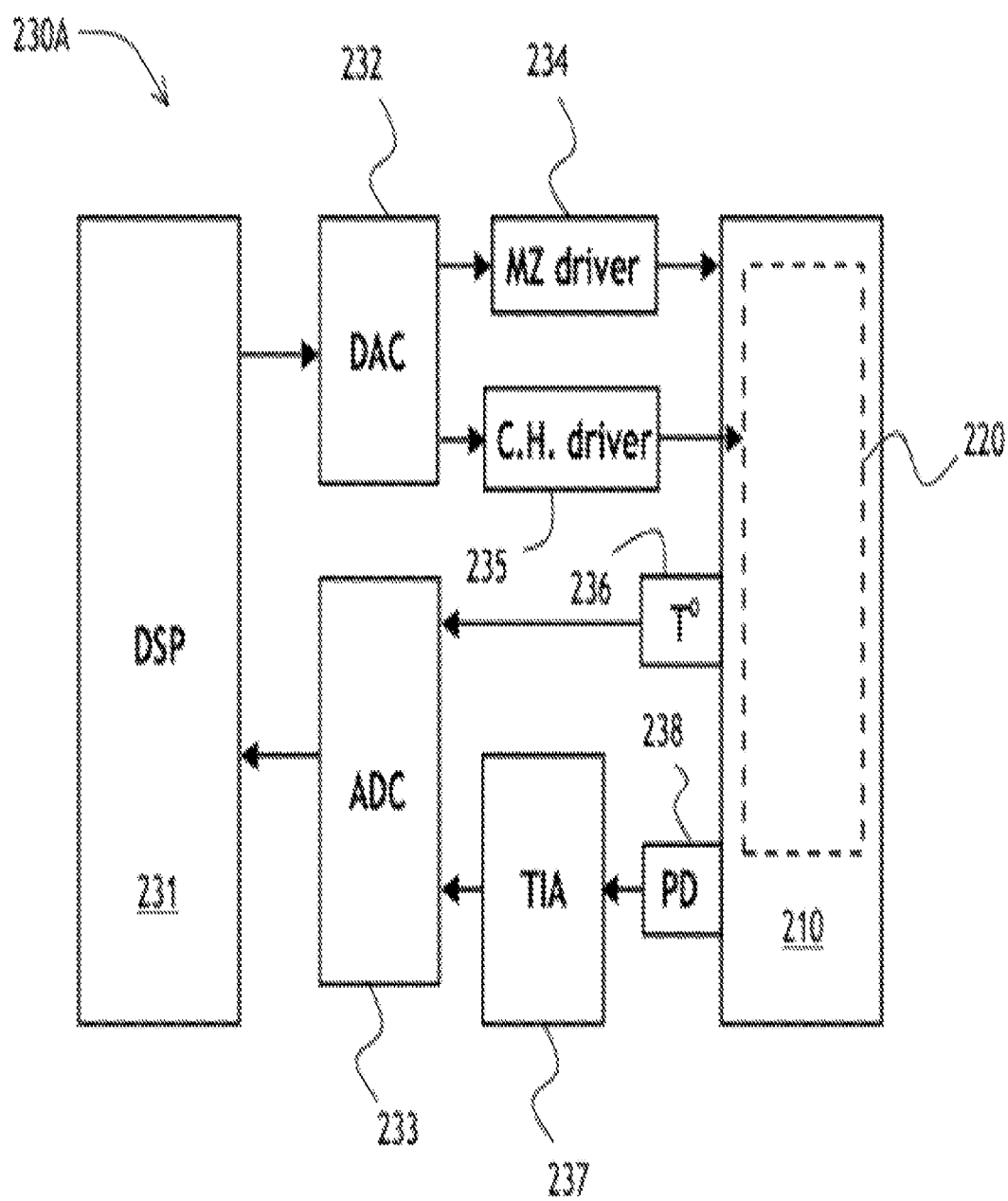
FIG. 17 is an electrical circuit block diagrams for thermal control of the flat-top tunable filter of FIG. 16.

Referring to FIG. 17, an electrical block diagram of a control circuit 230A for thermal control of the tunable filter PLC chip is shown. The circuit 230A, which is part of the controller of the filter, has a digital signal processing (DSP) module 231, a digital-to-analog converter (DAC) 232, an analog-to-digital converter (ADC) 233, a MZ interferometer heaters driver module 234, a compensation heater driver 235, a thermal sensor 236, a transimpedance amplifier (TIA) 237, and a photodiode 238.

In operation, the DSP module 231 controls the amount of heat applied to the chip 210 by providing a digital control signal to the DAC 232, which provides analog control signals to the MZ driver 234 and to the compensation heater driver 235. The MZ driver 234 generates electrical currents for driving local heaters of the chip (e.g., for the cascade of interferometers 10 and the bandpass flattening MZs 13, 14, 15, and 18). The CH driver 235 generates an electrical current for driving the compensation heater 220, which is disposed beneath the chip. In general, the DSP module 231 controls the amount of heat so that the total amount of heat generated by the local heaters and the compensation heater is constant, so that the temperature of the encased PLC chip does not change significantly upon tuning of individual MZ stages, thus providing a more stable alignment. The thermal sensor 236 generates an electrical signal representative of the temperature of the chip. This signal is digitized by the ADC 233 and, in digital form, is provided to the DSP module 231 for correcting the amount of heat generated by one or more heaters. According to one control method, the DSP module is operable to correct the amount of heat generated by the local heaters, not shown in FIG. 23A, so as to reduce dependence of the optical phases of the MZ interferometers on the overall PLC chip temperature. According to another control method of the present invention, the DSP module is operable to control the amount of the heat generated, so as to stabilize the temperature of the chip. Of course, alternative control circuits are possible, as for example, disclosed in U.S. Pat. No. 8,340,523.

Of course, the above embodiments and applications have been provided as examples only. It will be appreciated by those of ordinary skill in the art that various modifications, alternate configurations, and/or equivalents will be employed without departing from the spirit and scope of the invention. For example, while the above embodiments describe localized heaters for tuning the MZ interferometers, other optical path length adjusters are also possible. For example, in other embodiments, the localized heaters are replaced with acoustic, electric-field, or current-based optical path length adjusters. In addition, while the above described embodiment show the cascade of interferometers 10 and the band-shaping interferometer 13, 14, 15, 18 being formed on a same PLC chip, it other embodiments, the cascade of interferometers 10 and the band-shaping interferometer 13, 14, 15, 18 are formed on different chips. Accordingly, the scope of the invention is therefore intended to be limited solely by the scope of the appended claims

What is claimed is:

1. A tunable optical filter comprising:
an input port for receiving an optical signal including a plurality of optical frequency channels;
an output port for transmitting a selected optical frequency channel of the plurality of optical frequency channels;
a plurality of sequentially coupled, co-tuned Mach-Zehnder (MZ) interferometers optically disposed between the input port and the output port for isolating the selected optical frequency channel;
a counter-tuned MZ interferometer, connected in series with the plurality of sequentially coupled, co-tuned MZ interferometers, located between the input port and the output port;
wherein each co-tuned MZ interferometer, of the plurality of sequentially coupled, co-tuned MZ interferometers, and the counter-tuned MZ interferometer each include a respective first arm and a respective second arm, of a different length than the respective first arm, optically disposed between a first optical coupler and a second optical coupler, and
a controller for tuning the plurality of sequentially coupled, co-tuned MZ interferometers to a maximum transmission at a particular wavelength and the counter-tuned MZ interferometer to a low transmission at the particular wavelength such that a total transmission of the tunable optical filter is a sum of a Gaussian-like response of the plurality of sequentially coupled, co-tuned MZ interferometers and a sinusoidal response of the counter-tuned MZ interferometer.

2. The tunable optical filter of claim 1, wherein the controller is further to:
tune the plurality of sequentially coupled, co-tuned MZ interferometers to have:
a passband centered on a central frequency of the selected optical frequency channel, and
a stopband centered on a central frequency of each other optical frequency channel, of the plurality of optical frequency channels of the optical signal, to suppress each other optical frequency channel.

3. The tunable optical filter of claim 2, wherein the controller is further to:
tune the counter-tuned MZ interferometer to have low transmission at the central frequency of the selected optical frequency channel.

4. The tunable optical filter of claim 1, wherein the plurality of sequentially coupled, co-tuned MZ interferometers and the counter-tuned MZ interferometer are integrated on a planar lightwave circuit (PLC) chip.

5. The tunable optical filter of claim 4, further comprising:
a plurality of heaters, disposed on a surface of the PLC chip and coupled to a controller, for thermally tuning the plurality of sequentially coupled, co-tuned MZ interferometers and the counter-tuned MZ interferometer.

6. The tunable optical filter of claim 1, wherein the first optical coupler and the second optical coupler of the counter-tuned MZ interferometer have a coupling ratio between 75%/25% and 100%/0%.

7. The tunable optical filter of claim 1, wherein the first optical coupler and the second optical coupler are asymmetric couplers and have a coupling ratio of about 80%/20%.

8. The tunable optical filter of claim 1, wherein the respective first arm and the respective second arm, of each co-tuned MZ interferometer of the plurality of sequentially coupled, co-tuned MZ interferometers, provide a 50%/50% coupling ratio.

9. The tunable optical filter of claim 1, further comprising:
a second counter-tuned MZ interferometer optically disposed between the input port and the output port.

10. The tunable optical filter of claim 1, wherein the counter-tuned MZ interferometer has a free spectral range that is between about 50% and 150% of a predetermined grid spacing, a plurality of equidistantly spaced frequency passbands and frequency stopbands, and a free spectral range substantially equal to an integer multiple of the predetermined grid spacing.

11. The tunable optical filter of claim 1, further comprising:
an optical shutter optically disposed between the input port and the output port.

12. A method comprising:
passing an optical signal through a tunable optical filter, the optical signal including a plurality of optical frequency channels and the tunable optical filter comprising:
a plurality of sequentially coupled, co-tuned Mach-Zehnder (MZ) interferometers optically disposed between an input port and an output port for isolating a selected optical frequency channel of the plurality of optical frequency channels; and
a counter-tuned MZ interferometer, connected in series with the plurality of sequentially coupled, co-tuned MZ interferometers, located between the input port and the output port;
wherein each co-tuned MZ interferometer, of the plurality of sequentially coupled, co-tuned MZ interferometers, and the counter-tuned MZ interferometer each include a respective first arm and a respective second arm, of a different length than the respective first arm, optically disposed between a first optical coupler and a second optical coupler;
tuning the plurality of sequentially coupled, co-tuned MZ interferometers to have a passband centered on a central frequency of the selected optical frequency channel and a stopband centered on a central frequency of each other optical frequency channel, of the plurality of optical frequency channels of the optical signal, to suppress each other optical frequency channel; and tuning the counter-tuned MZ interferometer to have low transmission at the central frequency of the selected optical frequency channel such that a total transmission of the tunable optical filter is a sum of a Gaussian-like response of the plurality of sequentially coupled, co-tuned MZ interferometers and a sinusoidal response of the counter-tuned MZ interferometer.

13. The method of claim 12, wherein tuning the counter-tuned MZ interferometer to have low transmission at the central frequency of the selected optical frequency channel comprises:

tuning the counter-tuned MZ interferometer to have an optical intensity minimum at the center frequency of the selected optical frequency channel.

14. The method of claim 12, further comprising:

thermally tuning, using a plurality of heaters, the plurality of sequentially coupled, co-tuned MZ interferometers and the counter-tuned MZ interferometer.

15. The method of claim 14, wherein the plurality of heaters are disposed on a surface of a planar lightwave circuit (PLC) chip.

16. The method of claim 15, wherein the plurality of sequentially coupled, co-tuned MZ interferometers and the counter-tuned MZ interferometer are integrated on the PLC chip.

17. The method of claim 12, wherein the first optical coupler and the second optical coupler of the counter-tuned MZ interferometer have a coupling ratio between 75%/25% and 100%/0%.

18. The method of claim 12, wherein the first optical coupler and the second optical coupler are asymmetric couplers and have a coupling ratio of about 80%/20%.

19. The method of claim 12, wherein the respective first arm and the respective second arm, of each co-tuned MZ interferometer of the plurality of sequentially coupled, co-tuned MZ interferometers, provide a 50%/50% coupling ratio.

20. The method of claim 12, wherein the counter-tuned MZ interferometer has a free spectral range that is between about 50% and 150% of a predetermined grid spacing, a plurality of equidistantly spaced frequency passbands and frequency stopbands, and a free spectral range substantially equal to an integer multiple of the predetermined grid spacing.

* * * * *